Dec. 26, 1967 W. HANSLIK 3,359,826
DRIVING GEARING FOR PLASTIC EXTRUDERS
Filed Nov. 24, 1965
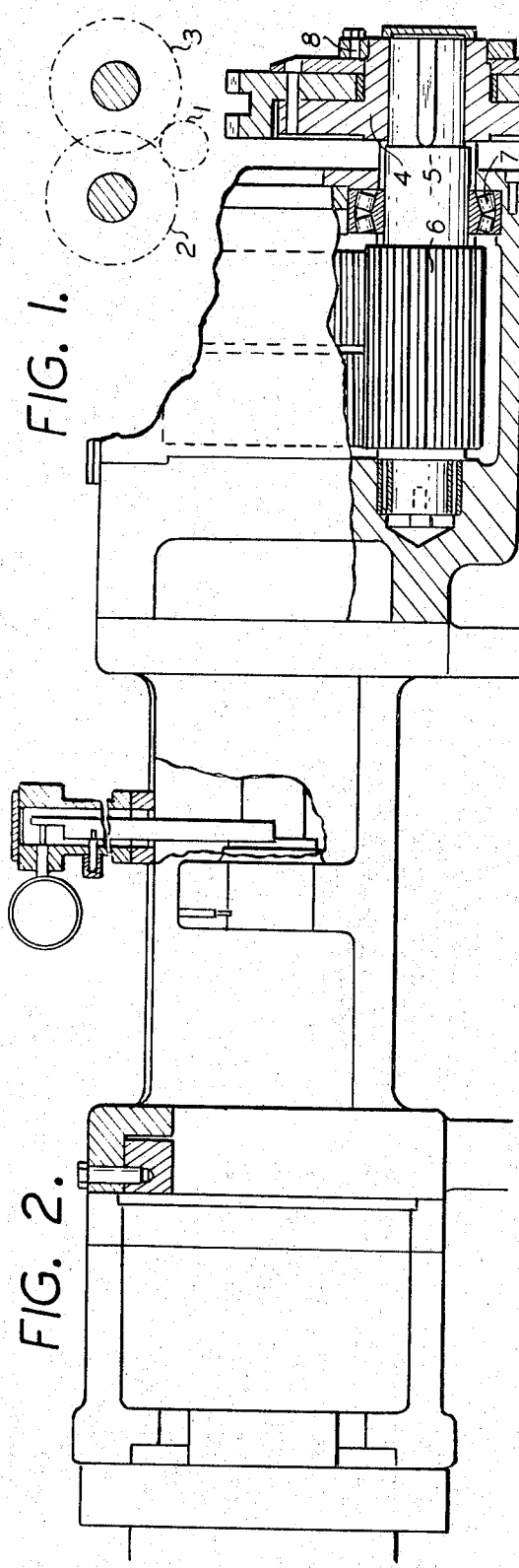
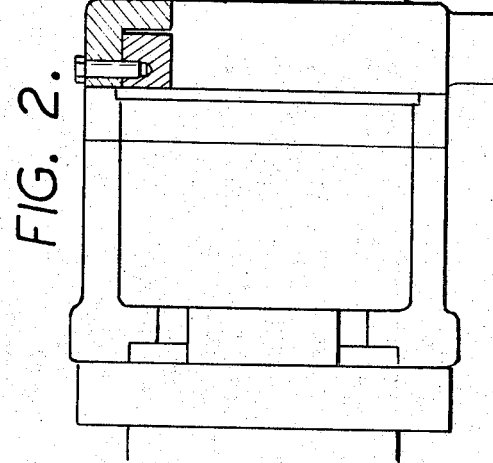
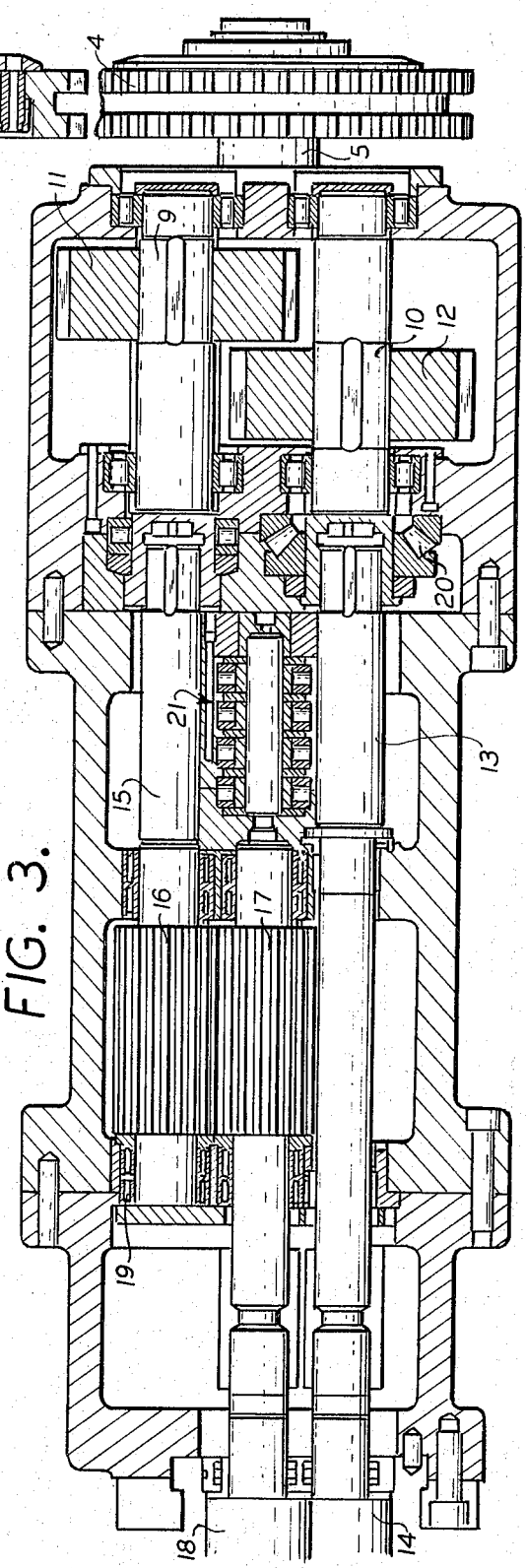

United States Patent Office 3,359,826
Patented Dec. 26, 1967

3,359,826
DRIVING GEARING FOR PLASTIC EXTRUDERS
Wilhelm Hanslik, Vienna, Austria, assignor, by mesne assignments, to Anger Plastic-Verarbeitungsmaschinen Gesellschaft m.b.H. & Co. KG., Vienna, Austria
Filed Nov. 24, 1965, Ser. No. 509,556
4 Claims. (Cl. 74—665)

ABSTRACT OF THE DISCLOSURE

A driving mechanism of a multi-screw extruder with at least two screws that have a predetermined distance between their axes, a main driving gear drives to driven gears, and each of the driven gears is mounted on one of two parallel driven shafts; one driven shaft is coaxial with one of the two screws and connected thereto; two meshing pinions are provided, one being driven from the other driven shaft and the other pinion driving the second extruder screw, and the axes of the two pinions are spaced apart for a certain distance; and the other driven shaft has its axis spaced apart from the axis of the first extruder screw for a distance that is independent of said predetermined distance between the axes of the two screws as well as from said certain distance between the axes of the meshing pinions.

---

This invention relates to driving mechanisms for plastic extruders especially of the multi-screw type.

One of the objects of the invention is to equalize the stress applied to the pinion gears of the different screws of multi-screw extruders, especially twin screw extruders.

Until now the screws of a twin-screw extruder were driven by pinion gears attached to their shafts, which due to the relatively small distance available between the screw had to be rather small and therefore subjected to relatively large stresses. Furthermore, in view of these limitations, only one of these pinion gears was driven from the driving motor of the extruder, while the other pinion gear had to be driven from the first gear. As a result of this asymmetrical arrangement the different pinion gears driving the different extruder screws were subjected to different loads and different stresses, especially different torsions which caused the tooth flanks of the gears at different loads to have different relative positions, thereby causing the cooperating teeth to engage each other on portions only of their longitudinal extension, while other teeth portions would be disengaged. Attempts have been made to overcome this uneven stress and the resulting uneven wear and tear of the gears by varying the angle of the tooth flanks along their longitudinal extension. However, such variation, if applied, could only be effective for a predetermined load. It would not be effective at other loads, in other words, the gears would mesh accurately only at certain loads, but would not mesh accurately at certain other loads. Under such other loads, therefore, especially at start and stop operation, uneven stresses and excessive wear would again become apparent, and reduce the life of the gears.

One of the objects of the invention is to reduce, if not eliminate these by driving all the pinion gears of the different screws positively and directly from a common power source.

As a more specific object of the invention in a twin-screw extruder the drive of the two screws is derived from a single shaft, preferably driven by a chain wheel, driving simultaneously a pair of primary pinion gears, one of which is coupled to one extruder screw, while the other primary pinion gear drives the second screw through a pair of secondary pinion gears, one coupled to the shaft of one of the primary pinion gears and the other couples to the shaft of the extruder screw.

In a more specific embodiment of the invention, the axial pressure of the first extruder screw is taken up by a pendulating conical roller bearing, arranged around the shaft connecting one of the primary pinion gears with the first extruder screw.

In another specific embodiment of the invention, the axial pressure of the second extruder screw is taken up by a number of—preferably four—axial cylindrical roller bearings arranged around a shaft connecting the other primary pinion gear with one of the secondary pinion gears.

These and other objects of the invention are more fully apparent from the drawing annexed herewith, in which FIG. 1 represents in a cross-section a schematical arrangement of gears embodying certain principles of the invention. FIG. 2 in a sideview shows the invention as applied to twin-screw extruder, and FIG. 3 illustrates a corresponding top view.

In FIG. 1 a main driving gear is indicated at 1 driving a pair of pinions 2, 3, the distance between which substantially is independent from the distance between a pair of extruder screws in a twin screw extruder.

As apparent in greater detail from the assembly shown in FIGS. 2 and 3, the motor drive extends from a motor not shown, coupled through a chain (also not shown) to sprocket or chain wheel 4, which drive the main shaft 5. Due to the higher speed of rotation of sprocket wheel 5 a smaller peripheral force results which makes it possible to reduce then the customary three-row to a two-row chain. The short bending distance in connection with the smaller peripheral force permits chain wheel 4 and chain pinion 6 to be arranged on a floating bearing (schematically indicated at 7). In this arrangement, the protection against breakage of the chain was found to be of the order of 12, or 33% higher than that of the old structure which was 9. As apparent from FIG. 2 a shear pin in chain wheel 4 is indicated at 8.

Chain wheel 4, rigidly connected with shaft 5 of pinion 6, transfers the torque evenly to two shafts, 9 and 10, which carry gears 11, 12. One of these gears is applied to drive directly over connecting shaft 13 the extruder screw 14. The other gear 11 drives over shaft 15 another pinion gear 16, meshing with pinion gear 17 which drives extruder screw 18.

Due to this arrangement it is possible to make the torsional stress on the cross section of the cores of pinions 16 and 17 substantially equal and, therefore, cause the tooth flanks to bear over the entire width of the teeth.

Compared to the old shaft construction, where the torsional stress over the cross-section of the core of pinion 16 was twice as high as that of pinion 17, the torsional stresses over the cross-section of the flanks of the teeth under load were equalized and the flanks themselves made substantially parallel to each other, and this for any amount of load.

Furthermore, the new pinion arrangement has the advantage of no longer being bound to a predetermined distance of say 2.5" as hitherto but many be arranged at any appropriate distance for example at 3" (module 5, number of teeth 14). By this type of equalization the life of the gear will be determined by pitting only; it has been practically established as to be of the order of about 11,000 hours.

The needle bearings of the pinions could also be improved as indicated at 19 by using inner rings or outer rings with firm borders on both sides respectively. At the same time the bearings also profit from the smaller peripheral force. The life of the bearings has also been found to be of the order of 11,000 hours.

The axial pressure of extruder screw 14 is taken up by a pendulating core roller bearing which is schematically shown at 20. The axial pressure of extruder screw 18 is taken up by a number of, preferably 4, axial cylindrical roller bearings as shown at 21, which are arranged in a springy serial cascade. Both axial bearings 20, 21 are designed to cover the same distance at the same pressures and here too, equalization of stress and wear and tear has been provided in accordance with the invention.

While the invention has been shown in connection with certain gears and gear arrangements, it is not limited thereto, but may be applied in any appropriate manner and in combination with any appropriate elements without departing from the scope of this disclosure.

I claim:
1. In a driving mechanism of a multi-screw extruder with at least two adjoining screws having their axes spaced apart from each other for a predetermined first distance, the combination of a main driving shaft, a main driving gear arranged on said main driving shaft, two driven gears meshing with said main driving gear, two parallel driven shafts each in driven connection with one of said driven gears, one of said driven shafts being coaxial with the first of said screws and connected thereto, two meshing pinions, one being in driven connection from said other driven shaft and the other pinion being in driving connection with said second extruder screw, the axes of said meshing pinions being spaced apart from each other for a second distance, the distance between the axis of the other driven shaft and the axis of the said first extruder screw being independent from said predetermined first distance and independent from said second distance.

2. In a driving mechanism, as claimed in claim 1, said second distance being longer than said predetermined first distance.

3. In a driving mechanism, as claimed in claim 1, said distance between the axis of said other driven shaft and the axis of said first extruder screw being longer than said second distance.

4. In a driving mechanism, as claimed in claim 1, said distance between the axis of said other driven sharft and the axis of said first extruder screw being longer than said predetermined first distance.

References Cited

UNITED STATES PATENTS

| | | | |
|---|---|---|---|
| 1,077,519 | 11/1913 | Gatta | 74—665 |
| 1,089,671 | 3/1914 | Rice et al. | 308—234 |
| 2,115,517 | 4/1938 | Capps | 74—665 |
| 2,368,151 | 1/1945 | McConnell | 74—665 |
| 2,865,118 | 12/1958 | Stewart | 74—665 X |
| 3,003,836 | 10/1961 | Hill | 308—234 |

DONLEY J. STOCKING, *Primary Examiner.*

ROBERT M. WALKER, *Examiner.*

L. H. GERIN, *Assistant Examiner.*